United States Patent
Wang

(10) Patent No.: US 8,454,175 B2
(45) Date of Patent: Jun. 4, 2013

(54) PROJECTOR AND METHOD FOR ADJUSTING PROJECTED IMAGE

(75) Inventor: Guang-Jian Wang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 189 days.

(21) Appl. No.: 13/187,530

(22) Filed: Jul. 21, 2011

(65) Prior Publication Data

US 2012/0154659 A1    Jun. 21, 2012

(30) Foreign Application Priority Data

Dec. 15, 2010 (CN) .......................... 2010 1 0589250

(51) Int. Cl.
*G03B 21/14* (2006.01)
*G06K 9/00* (2006.01)

(52) U.S. Cl.
USPC ............. 353/121; 353/31; 353/122; 382/267

(58) Field of Classification Search
USPC ................. 353/69, 121, 122; 382/162, 167
See application file for complete search history.

(56) References Cited

U.S. PATENT DOCUMENTS

| | | | |
|---|---|---|---|
| 2005/0001991 A1* | 1/2005 | Ulichney et al. | 353/69 |
| 2005/0206851 A1* | 9/2005 | Yokoyama et al. | 353/69 |
| 2005/0264767 A1* | 12/2005 | Inazumi | 353/69 |
| 2012/0127326 A1* | 5/2012 | Wang | 348/207.1 |
| 2012/0133781 A1* | 5/2012 | Wang et al. | 348/207.1 |
| 2012/0140084 A1* | 6/2012 | Wang et al. | 348/207.1 |
| 2012/0155760 A1* | 6/2012 | Wang | 382/167 |

* cited by examiner

*Primary Examiner* — William C Dowling
(74) *Attorney, Agent, or Firm* — Altis Law Group, Inc.

(57) ABSTRACT

In a method for adjusting projected images of a projector, a first image of a projection area is captured using an image capturing unit, and a second image of the projection area is capture after a predetermined interval. A background area of the second image is determined if the projected image of the projection area is determined as a static image by comparing the first image with the second image. The second image is divided into M pixel blocks, and brightness value of each pixel block is adjusted if a color of the pixel block is approximative to a color of the background area. A projection image is generated using the adjusted image of the second image, and the generated image is projected on the projection area.

18 Claims, 4 Drawing Sheets

PROJECTOR AND METHOD FOR ADJUSTING PROJECTED IMAGE

BACKGROUND

1. Technical Field

Embodiments of the present disclosure relate to optical devices and adjustment methods of the optical devices, and particularly to a projector and a method for adjusting projected images of the projector.

2. Description of Related Art

Projectors, such as projection-type image display apparatus, have high image quality, can be produced at low cost, and have been used in a variety of applications. Therefore, color reproducibility and image quality of a projector are important factors that depend on the application in which the projector is used. Since an image projected by the projector may suffer from uneven color and brightness, it is important to precisely improve the image quality of the projected image, for example, increase a background color discrimination between the original image and the projected image.

DETAILED DESCRIPTION

The present disclosure, including the accompanying drawings, is illustrated by way of examples and not by way of limitation. It should be noted that references to "an" or "one" embodiment in this disclosure are not necessarily to the same embodiment, and such references mean at least one.

Figure 1:
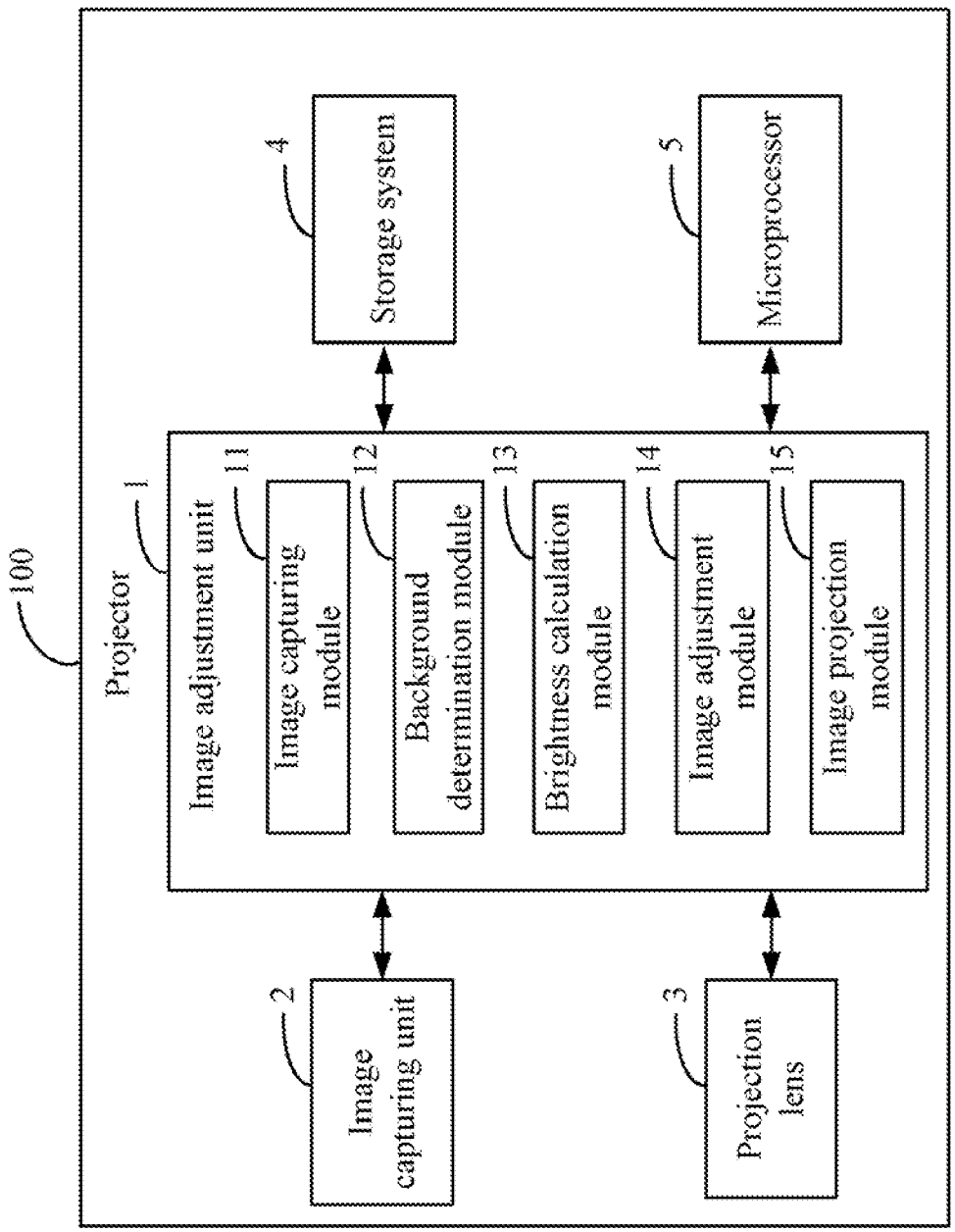
FIG. 1 is a block diagram of one embodiment of a projector including an image adjustment unit.

FIG. 1 is a block diagram of one embodiment of a projector 100 including an image adjustment unit 1. In the embodiment, the projector 100 further includes an image capturing unit 2, a projection lens 3, a storage system 4, and a least one microprocessor 5. It should be understood that FIG. 1 illustrates only one example of the projector 100, and may include more or fewer components than illustrated, or a different configuration of the various components in other embodiments.

In one embodiment, the image adjustment unit 1 may comprise computerized code in the form of one or more programs that are stored in the storage system 4 and executed by the at least one microprocessor 5. When the projector 100 projects an original image on a projection area, such as a wall surface or a display screen, the image adjustment unit 1 can capture the projected image of the projection area, adjust the captured image according to image data, such as a brightness of red, green, blue (RGB) channel of the captured image, and project the adjusted image on the projection area, so as to improve the display quality of the projected image.

The projection lens 3 is an optical lens which is operable to project images on the projection area. The image capturing unit 2 is operable to capture images from the projection area. The image capturing unit 2 may be a camera device, for example.

The storage system 4 stores a plurality of original images to be projected. The original images may include black and white images, and color images that may include, for example, red images, green images, and blue images. In one embodiment, the storage system 4 may be an internal storage device, such as a random access memory (RAM) for temporary storage of information, and/or a read only memory (ROM) for permanent storage of information. In some embodiments, the storage system 4 may also be an external storage device, such as an external hard disk, a storage card, or a data storage medium.

In the embodiment, the image adjustment unit 1 includes an image capturing module 11, a background determination module 12, a brightness calculation module 13, an image adjustment module 14, and an image projection module 15. The modules 11-15 may comprise computerized code in the form of one or more programs that are stored in the storage system 4. The computerized code includes instructions that are executed by the at least one microprocessor 5 to provide functions of the image adjustment unit 1. In general, the word "module," as used herein, refers to logic embodied in hardware or firmware, or to a collection of software instructions, written in a program language. In one embodiment, the program language may be Java, C, or assembly. One or more software instructions in the modules may be embedded in firmware, such as an EPROM. The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

The image capturing module 11 is operable to capture a first image of an original image projected on the projection area using the image capturing unit 2, and capture a second image of the projection area after a predetermined interval, such as two seconds or three seconds. In the embodiment, the image capturing module 11 is further operable to determine whether the projected image of the projection area is a static image or a dynamic image by comparing the first image and the second image.

If the first image is the same with the second image, the projected image is determined as a static image, and the second image is temporarily stored in the storage system 4. Otherwise, if the first image is different from the second image, the projected image is determined as a dynamic image, and another two images may be recaptured by the image capturing module 11.

The background determination module 12 is operable to divide a brightness value range, such as 0 to 255, based on RGB channels of pixels of the second image into a plurality of range intervals, and search for a target range interval from the range intervals, the target interval range containing brightness values of most pixels of the second image. And in response to a determination by the background determination module 12 that the projected image is determined as a static image, the background determination module 12 is further operable to determine an area that is composed of pixels of the target range interval as a background area of the second image. In one embodiment, the background determination module 12 may divide the brightness value range according to a normal distribution (Gaussian distribution) of brightness values of the pixels of the second image. For example, the brightness value range based on R channel may be divided as range intervals [0-50], [51-74], [75-90], [91-110], [111-120], ... , according to the normal distribution, and the background determination module 12 then counts an amount of pixels in each of the divided range intervals. The brightness value range based on G channel and B channel may also be divided correspondingly. In one example, if brightness values of most pixels, such as 50%, of the second image are distributed in the range interval [91-110] of the R channel, a range interval of [40-82] of the G channel, and a range interval [60-90] of the B channel, an area that is composed of the 50% pixels of the second image is determined as the background area.

In the embodiment, the background determination module 12 is further operable to calculate a first average brightness value IAED_0 of the background area based on the RGB channels. The first average brightness value IAED_0 includes an R channel average brightness value IAED_R_0, a G channel average brightness value IAED_G_0, and a B channel average brightness value IAED_B_0, of the background area. The value IAED_R_0 is calculated according to a calculation equation IAED_R_0=Rb/N, the value IAED_G_0 is calculated according to a calculation equation IAED_G_0=Gb/N, and the value IAED_B_0 is calculated according to a calculation equation IAED_B_0=Bb/N, where Rb represents a sum of brightness values of all pixels of the background area based on the R channel, Gb represents a sum of brightness values of all pixels of the background area based on the G channel, Bb represents a sum of brightness values of all pixels of the background area based on the B channel, and N represents that the background area has N pixels.

Figure 3:
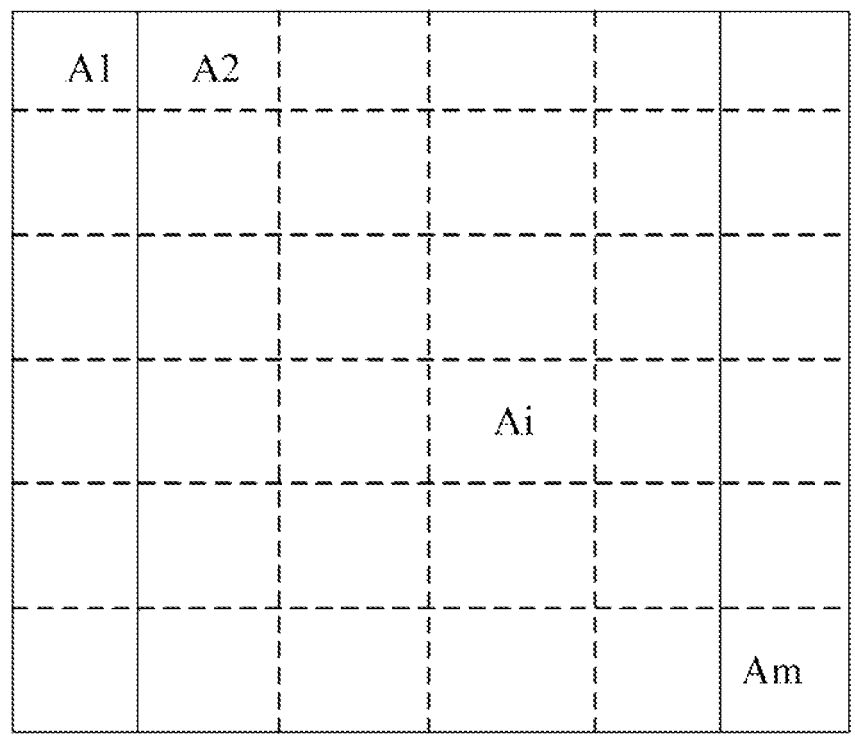
FIG. 3 is a schematic diagram illustrating one example of a captured image that is divided into M pixel blocks.
Figure 4:
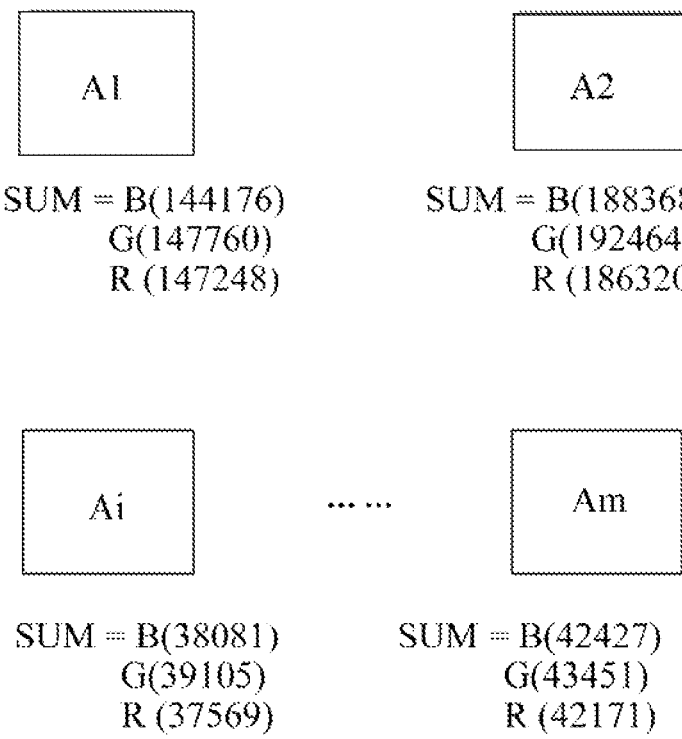
FIG. 4 is a schematic diagram illustrating one example of the brightness value of each of the pixel blocks of FIG. 3.

The brightness calculation module 13 is operable to divide the second image into M pixel blocks, such as pixel blocks A1, A2, . . . , Ai, . . . , Am of FIG. 3, and calculate a second average brightness value IAED_m of each of the pixel blocks. The second average brightness value IAED_m includes an R channel average brightness value IAED_R_m, a G channel average brightness value IAED_G_m, and a B channel average brightness value IAED_B_m, of the pixel block Am. In one example, as shown in FIG. 4, sum of brightness values of each pixel of the pixel block A1 based on the RGB channels are IAED_R_1, IAED_G_1, and IAED_B_1, in which IAED_R_1=147248, IAED_G_1=147760, IAED_B_1=144176. Assuming that the pixel block A1 has N×N pixels, the IAED_R_1=147248/N/N, the IAED_G_1=147760/N/N, and the IAED_B_1=144176/N/N.

The image adjustment module 14 is operable to determine whether a color of each pixel block Am of the second image is approximative to a color of the background area by comparing the second average brightness value IAED_m of each pixel block Am with the first average brightness value IAED_0. In one embodiment, if all inequalities of a×IAED_R_0<IAED_R_m<b×IAED_R_0, a×IAED_G_0<IAED_G_m<b×IAED_G_0, and a×IAED_B_0<IAED_B_m<b×IAED_B_0 are true, the color of the pixel block Am is determined as approximative to the color of the background area, where a is defined as a first empiric value, such as 1.2, and b is defined as a second empiric value, such as 1.6.

In the embodiment, the image adjustment module 14 is further operable to adjust brightness value of each pixel of the block Am based on RGB channels if the color of the pixel block Am is determined as approximative to the color of the background area, and substitute the adjusted pixel block for the pixel block Am. In one embodiment, the image adjustment module 14 may adjust a product of the first average brightness value IAED_0 and a third empiric value c as a brightness value of each pixel of the block Am, in which the empiric value c may be defined as 2.0. In one example, if the R channel average brightness value IAED_R_0 of the background area is 115, a brightness value of each pixel of the pixel block Am based on R channel (e.g. denoted as IAED_R_m) may be adjusted as 115×2=230, and a brightness value of each pixel of the Am based on G channel and B channel may be also adjusted according to the G channel average brightness value IAED_G_0 and the B channel average brightness value IAED_B_0 correspondingly.

The image projection module 15 is operable to generate a projection image using the adjusted image of the second image after each pixel block of the second image is compared, and project the generated projection image on the projection area.

Figure 2:
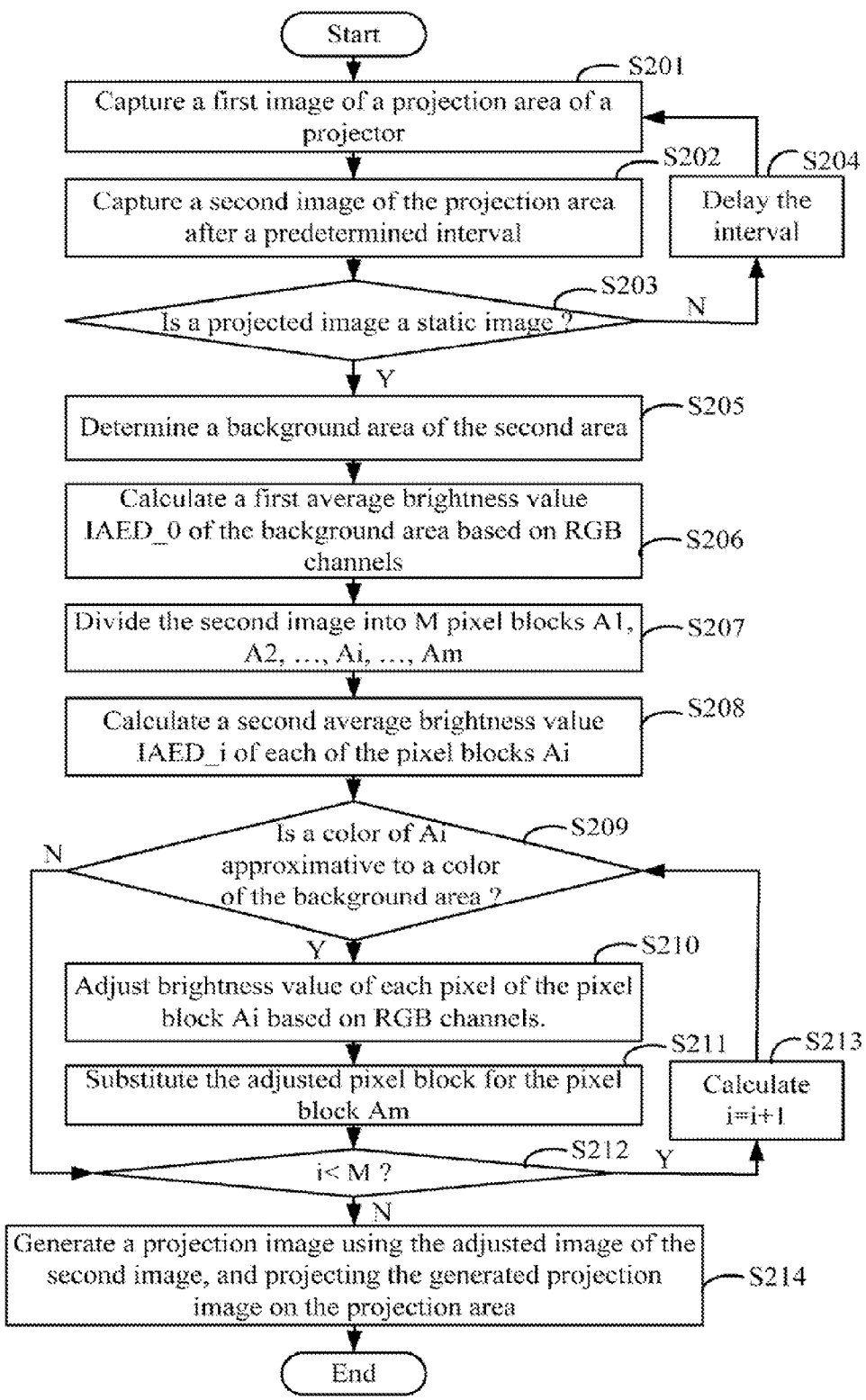
FIG. 2 is a flowchart of one embodiment of a method for adjusting projected images of the projector of FIG. 1.

FIG. 2 is a flowchart of one embodiment of a method for adjusting projected images of the projector of FIG. 1. Depending on the embodiment, additional blocks may be added, others removed, and the ordering of the blocks may be changed.

In block S201, the image capturing module 11 captures a first image of the projection area where an original image is projected by the projection lens 3 using the image capturing unit 2.

In block S202, the image capturing module 11 captures a second image of the projection area after a predetermined interval, such as two seconds or three seconds.

In block S203, the image capturing module 11 determines whether the projected image of the projection area is a static image or a dynamic image by comparing the first image and the second image. If the first image is the same as the second image, the projected image is determined as a static image, and block S205 is implemented. Otherwise, if the first image is different from the second image, the projected image is determined as a dynamic image, and block S204 is implemented.

In block S204, the image capturing module 11 delays a predetermined interval, such as two seconds or three seconds, procedure returns to the block S201 to recapture images of the projection area.

In block S205, the background determination module 12 divides a brightness value range, such as 0 to 255, based on RGB (red, green, blue) channels of pixels of the second image into a plurality of range intervals, searches for a target range interval in which contains brightness values of most pixels of the second image from the range intervals, and determine an area that is composed of pixels of target range interval as a background area of the second image. Detail of dividing the brightness value range are described above.

In block S206, the background determination module 12 calculates a first average brightness value IAED_0 of the background area based on the RGB channels. The first average brightness value IAED_0 includes an R channel average brightness value IAED_R_0, a G channel average brightness value IAED_G_0, and a B channel average brightness value IAED_B_0, of the background area. More details of the first average brightness value IAED_0 are provided above.

In block S207, the brightness calculation module 13 divides the second image into M pixel blocks, such as pixel blocks A1, A2, . . . , Ai, . . . , Am of FIG. 3.

In block S208, the brightness calculation module 13 calculates a second average brightness value IAED_m of each of the pixel blocks Am of the second image. The second average brightness value IAED_m includes an R channel average brightness value IAED_R_m, a G channel average brightness value IAED_G_m, and a B channel average brightness value IAED_B_m, of the pixel block Am.

In block S209, the image adjustment module 14 determines whether a color of a pixel block Ai of the second image is approximative to a color of the background area by comparing the second average brightness value IAED_i of the pixel block Ai with the first average brightness value IAED_0. If the color of each pixel block Ai is determined as approximative to the color of the background area, block S210 is implemented. Otherwise, block S212 is implemented. In one embodiment, if all inequalities of a×IAED_R_0<IAED_R_i<b×IAED_R_0, a×IAED_G_0<IAED_G_i<b×IAED_G_0, and a×IAED_B_0<IAED_B_i<b×IAED_B_0 are true, the color of the pixel block Ai is determined as approximative to the color of the background area, where a is defined as a first empiric value, such as 1.2, and b is defined as a second empiric value, such as 1.6, $1 \leq i \leq m$.

In block S210, the image adjustment module 14 adjusts brightness value of each pixel of the pixel block Ai based on RGB channels. In one embodiment, the image adjustment module 14 may adjust a product of the first average brightness value IAED_0 and a third empiric value c as a brightness value of each pixel of the block Ai, in which the empiric value c may be defined as 2.0.

In block S211, the image adjustment module 14 substitutes the adjusted pixel block for the pixel block Ai in the second image.

In block S212, the image adjustment module 14 determines whether i is less than M. If i is less than M, in block S213, the image adjustment module 14 calculates i=i+1, and the procedure returns to block S209. If i is equal to M, in block S214, the image projection module 15 generates a projection image using the adjusted image of the second image, and projects the generated projection image on the projection area.

Although certain disclosed embodiments of the present disclosure have been specifically described, the present disclosure is not to be construed as being limited thereto. Various changes or modifications may be made to the present disclosure without departing from the scope and spirit of the present disclosure.

What is claimed is:

1. A projector, comprising:
   a projection lens;
   an image capturing unit;
   storage system;
   at least one microprocessor; and
   one or more programs stored in the storage system and executable by the at least one microprocessor, the one or more programs comprising:
   an image capturing module operable to capture a first image of an original image projected on a projection area of the projector using the image capturing unit, capture a second image of the projection area after a predetermined interval, and determine whether the projected image of the projection area is a static image or a dynamic image by comparing the first image and the second image;
   a background determination module operable to divide a brightness value range based on RGB (red, green, blue) channels of pixels of the second image into a plurality of range intervals, search for a target range interval in which contains brightness values of most pixels of the second image from the range intervals, determine an area that is composed of pixels of the target range interval as a background area of the second image, and calculate a first average brightness value of the background area based on the RGB channels, if the projected image is determined as a static image;
   a brightness calculation module operable to divide the second image into M pixel blocks, and calculate a second average brightness value of each pixel block;
   an image adjustment module operable to determine whether a color of each pixel block is approximative to a color of the background area by comparing the second average brightness value of each pixel block with the first average brightness value, adjust brightness value of each pixel of the pixel block based on RGB channels if the color of the pixel block is determined as approximative to the color of the background area; and
   an image projection module operable to generate a projection image using the adjusted image of the second image after each pixel block of the second image is compared, and project the generated projection image on the projection area.

2. The projector according to claim 1, wherein the brightness value range is divided according to a normal distribution of brightness values of the pixels of the second image.

3. The projector according to claim 1, wherein the first average brightness value comprises an R channel average brightness value IAED_R_0, a G channel average brightness value IAED_G_0, and a B channel average brightness value IAED_B_0, of the background area, in which the value IAED_R_0 is calculated according to a calculation equation IAED_R_0=Rb/N, the value IAED_G_0 is calculated according to a calculation equation IAED_G_0=Gb/N, and the value IAED_B_0 is calculated according to a calculation equation IAED_B_0=Bb/N, where Rb represents a sum of brightness values of all pixels of the background area based on the R channel, Gb represents a sum of brightness values of all pixels of the background area based on the G channel, Bb represents a sum of brightness values of all pixels of the background area based on the B channel, and N represents that the background area has N pixels.

4. The projector according to claim 3, wherein the second average brightness value comprises an R channel average brightness value IAED_R_m, a G channel average brightness value IAED_G_m, and a B channel average brightness value IAED_B_m, of each pixel block.

5. The projector according to claim 4, wherein the color of the pixel block is determined as approximative to the color of the background area, if all inequalities of a×IAED_R_0<IAED_R_m<b×IAED_R_0, a×IAED_G_0<IAED_G_m<b×IAED_G_0, and a×IAED_B_0<IAED_B_m<b×IAED_B_0 are true, where a is defined as a first empiric value, and b is defined as a second empiric value.

6. The projector according to claim 1, wherein the brightness value of each pixel of the pixel block is adjusted as a product of the first average brightness value and a third empiric value.

7. A method for adjusting projected images of a projector, the method comprising:
   capturing a first image of an original image projected on a projection area of the projector using an image capturing unit, and capturing a second image of the projection area after a predetermined interval;
   determining whether the projected image of the projection area is a static image or a dynamic image by comparing the first image and the second image;
   dividing a brightness value range based on RGB (red, green, blue) channels of pixels of the second image into a plurality of range intervals, and searching for a target range interval in which contains brightness values of most pixels of the second image from the range intervals, if the projected image is determined as a static image;
   determining an area that is composed of pixels of the target range interval as a background area of the second image;
   calculating a first average brightness value of the background area based on the RGB channels;
   dividing the second image into M pixel blocks, and calculate a second average brightness value of each of the pixel blocks;

determining whether a color of each pixel block is approximative to a color of the background area by comparing the second average brightness value of each pixel block with the first average brightness value;

adjusting brightness value of each pixel of the pixel block based on RGB channels if the color of the pixel block is determined as approximative to the color of the background area; and generating a projection image using the adjusted image of the second image after each pixel block of the second image is compared, and projecting the generated projection image on the projection area.

8. The method according to claim 7, wherein the brightness value range is divided according to a normal distribution of brightness values of the pixels of the second image.

9. The method according to claim 7, wherein the first average brightness value comprises an R channel average brightness value IAED_R_0, a G channel average brightness value IAED_G_0, and a B channel average brightness value IAED_B_0, of the background area, in which the value IAED_R_0 is calculated according to a calculation equation IAED_R_0=Rb/N, the value IAED_G_0 is calculated according to a calculation equation IAED_G_0=Gb/N, and the value IAED_B_0 is calculated according to a calculation equation IAED_B_0=Bb/N, where Rb represents a sum of brightness values of all pixels of the background area based on the R channel, Gb represents a sum of brightness values of all pixels of the background area based on the G channel, Bb represents a sum of brightness values of all pixels of the background area based on the B channel, and N represents that the background area has N pixels.

10. The method according to claim 9, wherein the second average brightness value comprises an R channel average brightness value IAED_R_m, a G channel average brightness value IAED_G_m, and a B channel average brightness value IAED_B_m, of each pixel block.

11. The method according to claim 10, wherein the color of the pixel block is determined as approximative to the color of the background area, if all inequalities of a×IAED_R_0<IAED_R_m<b×IAED_R_0, a×IAED_G_0<IAED_G_m<b×IAED_G_0, and a×IAED_B_0<IAED_B_m<b×IAED_B_0 are true, where a is defined as a first empiric value, and b is defined as a second empiric value.

12. The method according to claim 1, wherein the brightness value of each pixel of the block is adjusted as a product of the first average brightness value and a third empiric value.

13. A non-transitory storage medium having stored thereon instructions that, when executed by at least one microprocessor of a projector, causes the microprocessor to perform a method for adjusting projected images of the projector, the method comprising:

capturing a first image of an original image projected on a projection area of the projector using an image capturing unit, and capturing a second image of the projection area after a predetermined interval;

determining whether the projected image of the projection area is a static image or a dynamic image by comparing the first image and the second image;

dividing a brightness value range based on RGB (red, green, blue) channels of pixels of the second image into a plurality of range intervals, and searching for a target range interval in which contains brightness values of most pixels of the second image from the range intervals, if the projected image is determined as a static image;

determining an area that is composed of pixels of the target range interval as a background area of the second image;

calculating a first average brightness value of the background area based on the RGB channels;

dividing the second image into M pixel blocks, and calculate a second average brightness value of each of the pixel blocks;

determining whether a color of each pixel block is approximative to a color of the background area by comparing the second average brightness value of each pixel block with the first average brightness value;

adjusting brightness value of each pixel of the pixel block based on RGB channels if the color of the pixel block is determined as approximative to the color of the background area; and generating a projection image using the adjusted image of the second image after each pixel block of the second image is compared, and projecting the generated projection image on the projection area.

14. The non-transitory storage medium according to claim 13, wherein the brightness value range is divided according to a normal distribution of brightness values of the pixels of the second image.

15. The non-transitory storage medium according to claim 13, wherein the first average brightness value comprises an R channel average brightness value IAED_R_0, a G channel average brightness value IAED_G_0, and a B channel average brightness value IAED_B_0, of the background area, in which the value IAED_R_0 is calculated according to a calculation equation IAED_R_0=Rb/N, the value IAED_G_0 is calculated according to a calculation equation IAED_G_0=Gb/N, and the value IAED_B_0 is calculated according to a calculation equation IAED_B_0=Bb/N, where Rb represents a sum of brightness values of all pixels of the background area based on the R channel, Gb represents a sum of brightness values of all pixels of the background area based on the G channel, Bb represents a sum of brightness values of all pixels of the background area based on the B channel, and N represents that the background area has N pixels.

16. The non-transitory storage medium according to claim 15, wherein the second average brightness value comprises an R channel average brightness value IAED_R_m, a G channel average brightness value IAED_G_m, and a B channel average brightness value IAED_B_m, of each pixel block.

17. The non-transitory storage medium according to claim 16, wherein the color of the pixel block is determined as approximative to the color of the background area, if all inequalities of a×IAED_R_0<IAED_R_m<b×IAED_R_0, a×IAED_G_0<IAED_G_m<b×IAED_G_0, and a×IAED_B_0<IAED_B_m<b×IAED_B_0 are true, where a is defined as a first empiric value, and b is defined as a second empiric value.

18. The non-transitory storage medium according to claim 13, wherein the brightness value of each pixel of the block is adjusted as a product of the first average brightness value and a third empiric value.

* * * * *